United States Patent [19]

Peterson et al.

[11] E Re. 30,350

[45] Reissued Jul. 29, 1980

[54] SELECTABLE MULTIPLE-NOZZLE SHOWERHEAD

[75] Inventors: Samuel F. Peterson, Chicago, Ill.; Alfons Rundzaitis, Beverly Shores, Ind.

[73] Assignee: Associated Mills, Inc., Chicago, Ill.

[21] Appl. No.: 862,531

[22] Filed: Dec. 20, 1977

Related U.S. Patent Documents

Reissue of:

[64] Patent No.: 3,998,390
Issued: Dec. 21, 1976
Appl. No.: 682,988
Filed: May 4, 1976

[51] Int. Cl.[2] ..... A62C 31/02

[52] U.S. Cl. ..... 239/394

[58] Field of Search ..... 239/394, 393, 101, 102, 239/443, 444, 446, 383; 128/24 R, 66, 67

[56] References Cited

U.S. PATENT DOCUMENTS

| | | | |
|---|---|---|---|
| D. 24,430 | 6/1895 | Morgan | D92/1 R |
| D. 146,308 | 2/1947 | Harman | D23/35 |
| D. 147,844 | 11/1947 | Ferrera | D23/35 |
| D. 212,535 | 10/1968 | Barker | D23/35 |
| D. 224,834 | 9/1972 | Landell | D23/35 |
| D. 228,908 | 10/1973 | Juhlin | D23/35 |
| D. 230,850 | 3/1974 | Pinke | D23/34 |
| D. 231,697 | 5/1974 | Grube | D23/34 |
| D. 235,445 | 6/1975 | Mackay et al. | D23/35 |
| D. 237,708 | 11/1975 | Grohe | D23/35 |
| D. 240,249 | 6/1976 | Chellman | D21/219 |
| D. 240,428 | 7/1976 | Colan | D23/40 |
| D. 240,439 | 7/1976 | Smith | D21/87 |
| 191,199 | 5/1877 | Tomlinson | 239/394 |
| 464,335 | 12/1891 | Scott | 239/394 X |
| 1,199,470 | 9/1916 | Leachtneaver | 239/101 X |
| 2,132,333 | 10/1938 | Wendell et al. | 239/394 X |
| 2,388,093 | 10/1945 | Smith | 239/394 X |
| 2,790,680 | 4/1957 | Rosholt | 239/394 X |
| 3,132,333 | 9/1961 | Brooke | 340/345 |
| 3,291,395 | 12/1966 | Sharp | 239/318 |
| 3,377,028 | 4/1968 | Bruggeman | 239/394 |
| 3,516,611 | 6/1970 | Piggott | 239/391 |
| 3,558,061 | 1/1971 | Hansen | 239/394 |
| 3,596,835 | 8/1971 | Smith et al. | 239/394 |
| 3,684,176 | 8/1972 | Hruby | 239/101 |
| 3,704,831 | 12/1972 | Clark | 239/394 |
| 3,711,029 | 1/1973 | Bartlett | 239/394 |
| 3,739,983 | 6/1973 | Jousson | 239/101 |
| 3,762,648 | 10/1973 | Deines et al. | 239/383 |
| 3,776,460 | 12/1973 | Fichter | 239/101 |
| 3,801,019 | 4/1974 | Trenary | 239/383 |
| 3,810,465 | 5/1974 | Lambert | 128/66 |
| 3,814,326 | 6/1974 | Bartlett | 239/276 |
| 3,830,432 | 8/1974 | Grohe | 239/394 |
| 3,865,310 | 2/1975 | Elkins et al. | 239/283 |
| 3,892,262 | 7/1975 | Dahlman | 24/205.16 C |
| 3,892,363 | 7/1975 | Hilger | 239/590 |
| 3,958,756 | 5/1976 | Trenary et al. | 239/102 |
| 3,998,370 | 12/1976 | Grimland | 226/150 |
| 3,998,396 | 12/1976 | Umphrey | 241/81 |

FOREIGN PATENT DOCUMENTS

| | | | |
|---|---|---|---|
| 154677 | 1/1954 | Australia | 239/394 X |

*Primary Examiner*—Robert B. Reeves
*Assistant Examiner*—Gene A. Church
*Attorney, Agent, or Firm*—Allegretti, Newitt, Witcoff & McAndrews

[57] ABSTRACT

The improved showerhead disclosed herein includes at least two, and preferably four, separate spray nozzles and is constructed so as to permit users to select the particular spray nozzle through which water is to be discharged. The showerhead may be mounted on the end of a conventional shower arm extending from a wall or may be held in the user's hand and connected with a source of water by a flexible conduit.

The showerhead comprises a housing having disc member and dial assembly mounted thereon. The dial assembly includes the spray nozzles, and the selection of a particular spray nozzle is achieved by manually rotating the dial assembly, with respect to the disc member and housing, about its central axis. A novel "butterfly" seal is disposed between the disc member and the dial assembly. A latch is mounted on the housing and cooperates with the dial assembly to retain the dial assembly in its proper position with respect to the disc member. The latch also serves as an indicator to enable the user of the showerhead to know where to position the dial assembly, with respect to the disc member and housing, so that water will be sprayed through a particular spray nozzle. The structure of one of the spray nozzles, when utilized in cooperation with the disc member, provides a pulsating, invigorating spray.

38 Claims, 14 Drawing Figures

SELECTABLE MULTIPLE-NOZZLE SHOWERHEAD

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates to an improved showerhead for use in a bathroom shower and the like and more particularly, to a novel, improved wall-mounted or hand-held showerhead that permits the user to select which of at least two, and preferably four, spray nozzles is to be utilized to discharge water.

In the past, a variety of different types of wall-mounted and hand-held showerheads have been known. Generally the showerheads heretofore available for use have included only a single spray nozzle although such a spray nozzle often included a plurality of spaced apertures or water discharging orifices. Some prior showerheads have provided a "pulsating" discharge. Such "pulsating" showerheads have generally utilized a mechanical or other movable means to create the "pulsating" effect. The Deines et al, U.S. Pat. No. 3,762,648, and the Trenary et al. U.S. Pat. No. 3,801,019, disclose showerheads of this type i.e., which provide a pulsating discharge by mechanical means. We are also aware of a nozzle assembly which provides a pulsating discharge when used with a hydrotherapy bath unit without the utilization of any mechanical means, and which is disclosed in the Hilger U.S. Pat. No. 3,892,363, assigned to the assignee of this application.

Other liquid spraying devices have included a plurality of separate spray nozzles or oficies and have been designed so as to permit the selection of the particular spray nozzle or orifice through which liquid was to be discharged. The Wendell et al. U.S. Pat. No. 2,132,333; the Smith U.S. Pat. No. 2,388,093; the Rosholt U.S. Pat. No. 2,790,680; the Sharp U.S. Pat. No. 3,291,395; the Bruggerman U.S. Pat. No. 3,377,028; the Piggott U.S. Pat. No. 3,516,611; the Hansen U.S. Pat. No. 3,558,061; the Smith U.S. Pat. No. 3,596,835; the Bartlett U.S. Pat. No. 3,711,029; and the Bartlett U.S. Pat. No. 3,814,326, disclose liquid spraying devices of this general type. While these prior liquid spraying devices have performed, or are apparently capable of performing their intended function in a generally satisfactory fashion, these prior devices have had some disadvantages. Generally these devices have a tendency to leak, and in an effort to prevent, or at least minimize leakage, the structure of the devices has frequently become relatively complicated and thus is expensive to manufacture. In some of the prior devices, it is difficult, and in certain instances impossible, to change from one spray nozzle or orifice to another while liquid is being discharged. This, of course, limits the utility and the purchaser acceptance of these devices.

It is a primary object of our present invention to provide an improved showerhead which is adapted for use in bathroom showers and the like and which, because of the simplicity of its design and structure, may be relatively inexpensively manufactured. Another object of the present invention is to provide an improved showerhead of the type described wherein the showerhead includes a plurality of separate and distinct spray nozzles and wherein the user may select the particular spray nozzle to be utilized and may readily change from using one showerhead to another even while the water is running. Still another object of the present invention is to provide an improved showerhead of the type described wherein a novel "butterfly" seal is utilized to afford superior sealing characteristics and wherein one of the spray nozzles embodied in the showerhead provides, solely as a result of its particular design and construction, a pleasing, pulsating discharge.

More specifically, the improved showerhead of our invention includes a housing which, in part, serves as a conduit through which water may flow. The housing may be mounted on the end of a conventional shower arm extending from a bathroom wall or may include a handle or portion to be gripped in the user's hand. One end of the housing is adapted to be connected with a source of water under pressure, e.g., the conventional shower arm. When the showerhead is designed to be mounted on a wall, the one end of the housing is connected directly to the end of the shower arm pipe. When the showerhead is designed to be hand-held, the one end is connected, via flexible conduit, to the shower arm or any other conventional faucet.

A generally circular disc member is mounted on the other end of the housing so that water flowing through the housing communicates with the rear surface of the disc member. The disc member includes a central aperture and a first, off-set aperture which is disposed between the central aperture and the outer peripheral side edge of the disc member.

A dial assembly is connected with the housing and the rear surface of the dial assembly is positioned adjacent to the front surface of the disc member. The front surface of the dial assembly includes at least two, and preferably four, separate and distinct spray nozzles. The rear surface of the dial assembly includes a plurality of off-set nozzle apertures, one for each of the spray nozzles, which communicate with their respective spray nozzles and which are positioned between the central axis of the dial assembly and its outer peripheral side edge so that they can be aligned with the first aperture in the disc member. A centrally disposed post, coaxial with the central axis of the dial assembly, projects rearwardly from the dial assembly. The rear end of the post is disposed and journaled in the central aperture of the disc member so that the dial assembly may be rotated about its central axis with respect to the disc member and housing. Relative rotation between the dial assembly and the disc member permits a nozzle aperture to be brought into and out of registry with the first aperture in the disc member. When a nozzle aperture is in registry with the first aperture, water may flow from the housing through the first aperture, the nozzle aperture and hence into and through the spray nozzle.

A novel "butterfly" seal is mounted on the front surface of the disc member and is positioned between the disc member and dial assembly and about the first aperture of the disc member. The "butterfly" seal provides superior sealing characteristic when a nozzle aperture is being brought into registry with the first aperture, when it is in registry with the first aperture and when it is being moved out of registry with the first aperture. This seal effectively prevents leakage between the relatively movable dial assembly and the disc member.

A novel latch means is mounted on the housing and includes an intermediate portion and a distal end portion. The intermediate portion overlies and spans the outer peripheral side edge of the dial assembly and the distal end portion abuts the front surface of the dial assembly at a point adjacent to the first aperture of the disc member. The latch means applies a rearwardly directed, restraining or latching force to the front surface of the dial assembly at a point adjacent to the first aperture of the disc member so as to counteract the forwardly directed force resulting from the pressure of the water in the first aperture. Thus the latch means acts to prevent the water pressure force from tending to separate the disc member and the dial assembly. The latch means also serves as an indicator to enable a user of the showerhead to position a particular nozzle aperture properly in registry with the first aperture in the disc member.

As noted above, one of the spray nozzles included in the dial assembly provides a pleasing, pulsating water spray. This pulsating spray results from the turbulence of the water in the spray nozzle immediately upstream from the nozzle's discharge orifice. This turbulence is caused by the particular structure and structural arrangement of this spray nozzle which includes an outer conical wall, an inner conical wall and a discharge orifice wall. These three walls, together with the rear surface of the nozzle assembly, define a turbulence cavity. The water discharge orifice is formed in the discharge orifice wall so that the central axes of the outer conical wall, the inner conical wall, the discharge orifice wall and the discharge orifice are coaxial and are off-set from, but parallel to the central axis of the nozzle aperture associated with this spray nozzle and so that the plane of the discharge orifice wall is transverse to the central axes of the outer conical wall, the inner conical wall and water discharge orifice. The outer conical wall has its first, larger diameter end disposed adjacent to the rear surface of the dial assembly and its second, smaller diameter and disposed adjacent to the front surface of the dial assembly. The inner conical wall is disposed generally within the outer conical wall and has its first, larger diameter end disposed adjacent to and connected with the second, smaller diameter end of the outer conical wall and has its second, small diameter end disposed within the turbulence cavity and between the first and second ends of the outer conical wall. The discharge orifice wall extends across, and except for the discharge orifice formed therein, completely closes the smaller diameter end of the inner conical wall.

One of the important advantages of our improved showerhead, from the standpoint of commercializing our showerhead, is that is components have a relatively simple design and construction and can thereby be manufactured relatively inexpensively. In addition, the design and construction of its components permits the manufacture of a compact, stylish showerhead and this, or course, adds greatly to the sales appeal of our showerhead. Moreover, the simplicity of the showerhead components permits the use of relatively simple inexpensive sealing techniques and this not only reduces the manufacturing cost of the showerhead, but in addition, assures that the showerhead will not have any significant leakage problems.

These and other objects and advantages of the present invention will become apparent from the following description of the preferred embodiments of our invention, described in connection with the accompanying drawings.

Figure 1:
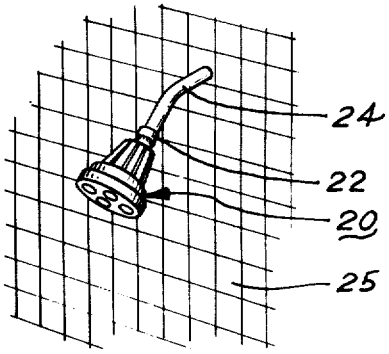
FIG. 1 is a perspective view showing one embodiment of the improved showerhead of our present invention mounted on a bathroom wall.

Throughout the various figures of the drawings, the same reference numerals will be used to designate the same parts or components in the various showerheads. Moreover, when the terms "front," "rear," "front end," "rear end," "forward" and "rearward," are used herein, it is to be understood that these terms have reference to the structures shown in the drawings as they would appear to a person viewing the drawings and how such showerheads are normally used.

DESCRIPTION OF THE PREFERRED EMBODIMENTS

Referring not to FIG. 1 ∝ 7 and 12, one embodiment of the improved showerhead of our present invention is shown generally at 20. As best shown in FIG. 1, the showerhead 20 is adapted to be mounted on the distal, threaded end 22 of a conventional shower arm pipe 24 that projects or extends from the wall 25 in a bathroom shower or the like. The showerhead 20 includes a housing 26, a disc member 28 and a dial assembly 30 which are connected together when in use and which have an overall commercially attractive outer appearance.

Figure 2:
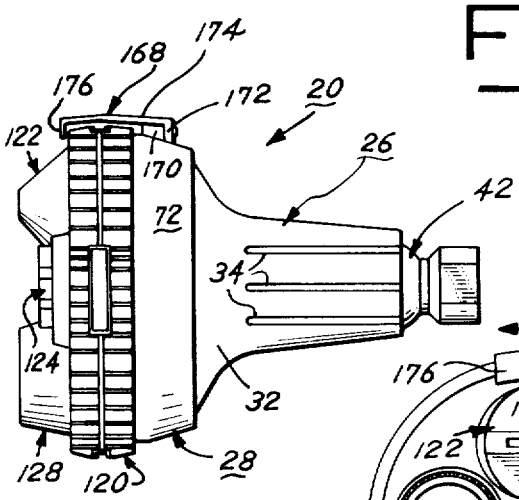
FIG. 2 is a top plan view of the improved showerhead shown in FIG. 1.
Figure 4:
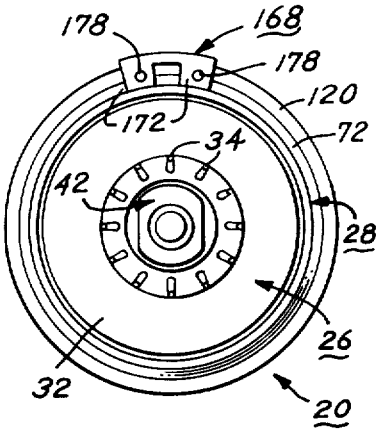
FIG. 4 is a rear elevational view of the improved showerhead shown in FIG. 1.
Figure 5:
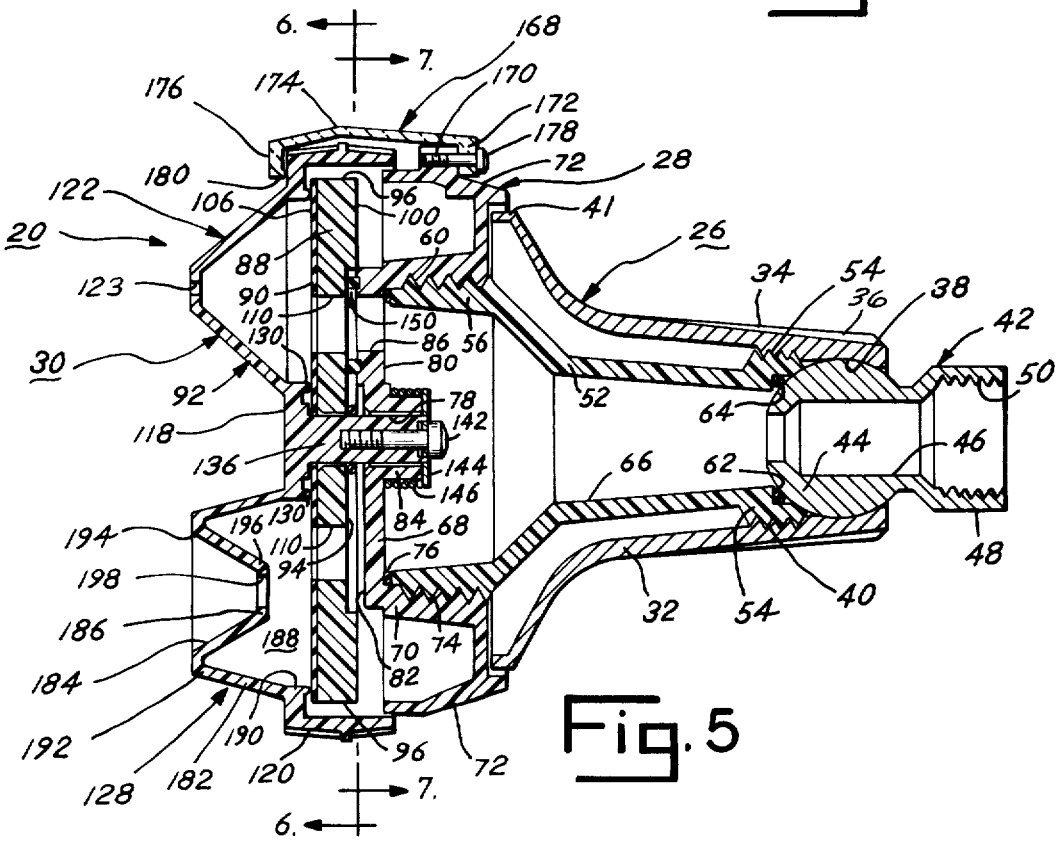
FIG. 5 is a cross-sectional view taken along the line 5—5 in FIG. 3.
Figure 6:
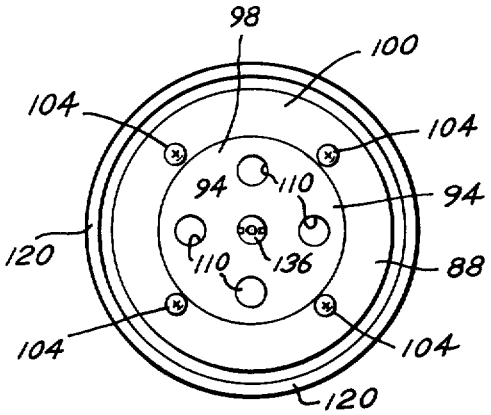
FIG. 6 is a cross-sectional view taken along the line 6—6 in FIG. 5.

The housing 26 includes an outer generally conical member 32 whose outer surface may, as shown in FIGS. 2, 4 and 5, include a plurality of decorative, longitudinal "flutes" 34 to enhance its attractiveness. The rear, smaller diameter end 36 of the member 32 includes an internal, annular recess 38 which is designed to receive a spherical member. A threaded portion 40 is formed adjacent to the rear end 36 of the member 32, immediately forward of the recess 38. The forward end 41 of the member 32 is disposed adjacent to, but not in contact with, the disc member 28.

A conventional ball swivel joint 42 is mounted in the rear end 36 of the outer member 32 and includes a ball member 44 disposed in the recess 38 of the rear end 36. A longitudinal passage 46 extends through the joint 42 from one end to the other. The rear end 48 of the joint 42 includes internal threads 50 which are adapted to cooperate with the ½-inch threads on the distal end 22 of the conventional shower arm pipe 24 and which are used to connect the showerhead 20 with the pipe 24 and thus with a source of water under pressure such as a conventional household water system.

An inner, generally tubular member 52 is disposed substantially within the outer member 32 and includes a rear, smaller diameter end 54 and a front, larger diameter end 56. External threaded portions 58 and 60 are formed about the rear and front ends 54 and 56 of the inner member 52, and an annular recess 62 is formed in the member 52 adjacent to the rear end 54. The threaded portion 58 is adapted to engage internal threads 40 formed on the outer member 32, and the threaded portions 40 and 58 are designed so that there is an "interference" engagement between these threaded portions so as to prevent water from leaking therebetween. The rear end 54 of the member 52 abuts the ball member 44 of the swivel joint 42 and serve to restrain movement of the ball 44 with respect to the annular recess 38 in the outer member 32. In other words, the abutment between the rear end 54 and the ball member 44 serves to prevent relative movement between the swivel joint 42 and the rest of the housing 26. A conventional O-ring seal 64 is disposed within the recess 62 so as to prevent water from leaking between the rear end 54 of the inner member 52 and the ball member 44 of the swivel joint 42.

As shown in FIG. 5, the member 52 defines a conduit shown generally at 66. Thus, when water is permitted to flow through the shower arm pipe 24, as when the faucet associated with the pipe 24 is opened, the water may also flow through the passage 46 in the swivel joint 42 and into and through the conduit 66 in the member 52 from its rear end 54 to its front end 56.

The disc member 28 includes a circular, central portion 68 and an integral, radially outwardly disposed outer portion 70 having a generally U-shaped, transverse cross-section and having a generally annular, outer peripheral side edge 72 that, in appearance, provides a relatively smooth continuation of the front larger diameter end 41 of the outer member 32 of the housing 26. A threaded portion 74 is formed on the outer portion 70, adjacent to the outer periphery of the central portion 68, and engages the threaded portion 60 on the front end 56 of the inner member 52. Threaded portions 60 and 74 are designed so that there is an "interference" fit between these portions so as to prevent water from leaking therebetween. A conventional O-ring seal 76 is disposed between the front end 56 of the inner member 52 and the outer peripheral edge of the central portion 68 so as to further assist in preventing any leakage of water between the inner member 52 and the disc member 28.

A central aperture 78 is formed in the central portion 68 of the disc member 28 and extends therethrough from the rear surface 80 to the front surface 82 of the disc member 28. The central axis of the aperture 78 is coaxial with the central axes of the disc member 28 and the housing 26, including the axes of the inner and outer members 52 and 32, respectively, and the conduit 66. A first, set-off aperture 86 is formed in the central portion 68 of the disc member 26 adjacent to the outer peripheral edge of the central portion and extends through the central portion from its rear surface 80 to its front surface 82. The central axis of the first aperture 86 is radially off-set from but parallel to the central axis of the central aperture 78.

The dial assembly 30 includes a plate member 88, a seal member 90 and a dial member 92. When the dial assembly 30 is connected with the showerhead 20, the rear surface 94 of the plate member 88 is disposed adjacent to the front surface 82 of the disc member 28. As described in more detail hereinafter, the plate member 88, seal member 90 and dial member 92 are secured together as a unit, with the seal member 90 being disposed between the plate member 88 and the dial member 92.

The plate member 88 has a generally circular configuration and an annular outer peripheral side edge 96. The rear surface 94 of the plate member 88 has a recessed, circular, central portion 98 and a radially outwardly disposed, annular portion 100. The central portion 98 is flat and has generally the same diameter, as the central portion 68 of the disc member 28. The annular portion 100 has four identical holes 102 formed therein that are equi-spaced about and from the central axes of the plate member 88 and that are adapted to receive screws, one of which being shown at 104. The front surface 106 of the plate member 88 is flat.

A central aperture 108 is formed in the plate member 88 so that its central axis is coaxial with the central axis of the plate member 88 and so that it has substanially the same diameter as the central aperture 78 of the disc member 28. Four off-set identical nozzle apertures 110 are formed in the central portion 98 of the plate member 88 and are equi-spaced about and from the central axis of the plate member 88. The central axes of each of these nozzle apertures 110 is off-set from but parallel to the central axis of the central aperture 108, and the radial distance between the central axis of the aperture 108 and the central axis of each of the nozzle apertures 110 is equal to the radial distance between the central axis of the central aperture 78 and central axis of the first aperture 86 of the disc member. In addition, the diameter of each of the nozzle apertures 110 is equal to the diameter of the first aperture 86. Thus, when a nozzle aperture 110 is aligned with or in registry with the first aperture 86, a smooth, continuous flow path is defined by the two apertures 110 and 86.

The seal member 90 comprises a circular, relatively thin sheet of relatively soft, flexible plastic material such as, for example butyl duro 50. The diameter of the seal member 90 is equal to the outer diameter of the plate member 88. A central aperture 112 is formed in the center of the seal member 90 so that the central axis of this aperture 112 is coaxial with the central axis of the seal member 90. Four off-set, circular identical apertures 114 are formed about the central portion of the member 90 and are equi-spaced about and from the central axis of the aperture 112. These apertures 114 are the same size as the nozzle aperture 110 and are aligned with the nozzle apertures 110 when the dial assembly 30 is mounted on the disc member 28. Four off-set, identical holes 115 are formed about the outer periphery of the member 90 and are equi-spaced about and from the central axis of the aperture 112 so that these holes 115 are aligned with the holes 102 formed in the plate member 88 when the dial assembly 30 is mounted on the disc member 28. The seal member 90 provides a seal between the front surface 106 of the plate member and the rear surface 116 of the dial member 92.

Figure 3:
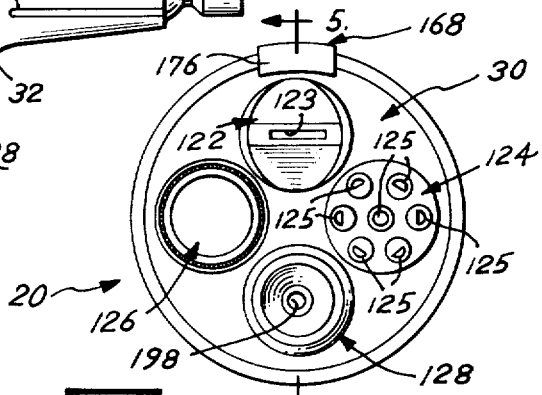
FIG. 3 is a front elevational view of the improved showerhead shown in FIG. 1 showing the configuration and arrangement of the four spray nozzles used with this showerhead.

The dial member 92 includes as noted above, a rear surface 116, a front surface 118, and an outer peripheral side edge 120 which extends rearwardly from the plane of the rear surface 116 so that when the dial assembly 30 is mounted on the showerhead, the side edge 120 overlies the side edge 96 of the plate member 88 and the front portion of the side edge 72 of the disc member 26. Four different and separate spray nozzles 122, 124, 126 and 128 are formed in the front surface 118 of the dial member 92 and are equispaced about and from the central axis 8 of the dial member 92. Each spray nozzle is designed to provide a distinctively different type of water spray or discharge. More specifically and as best shown in FIG. 3, the spray nozzle 122 provides a soothing "waterfall" type spray or discharge throughan elongated orifice 123, the spray nozzle 124 has seven relatively large orifices 125 which provide a relatively coarse spray; the spray nozzle 126 provides a relatively fine, soft tingly spray through a plurality of relatively small orifices; and the spray nozzle 128 provides a pulsating invigorating spray or discharge. The specific structure of the spray nozzles 122, 124 and 126 is conventional and the novel structure of the spray nozzle 128 will be more completely described hereinafter. Each of the spray nozzles 122–28 is in communication with and associated with a nozzle aperture 110 so that when the nozzle aperture 110 is in registry with the first aperture 86, water may flow into the spray nozzle. Except for the nozzle apertures 110 associated with the spray nozzles 122–28, the rear ends of the spray nozzles are closed by the seal member 90 and the front surface 106 of the plate member 88. In this regard, each of the spray nozzles has a rearwardly projecting rim, shown generally at 130, surrounding it, and these rims 130 abut the seal member 90 and thus the front surface 106 when the dial assembly 30 is mounted on the showerhead 20.

The rear surface 116 of the dial member 92 includes four integral, identical rearwardly extending shoulders or posts 132 which are equi-spaced about and from the central axis of the member 92 and which are aligned with holes 102 and 114 so that screws 104 can be screwed into the counterbores 134 formed in the distal ends of the shoulders 132. As a result of the cooperation between the screws 104 and the shoulders 132, the plate member 88, the seal member 90 and the dial member 92 are secured together as a unit, i.e., as the dial assembly 30, and are not free to move relatively with respect to each other.

A rearwardly extending central post 136 is formed on the rear surface 116 of the dial member 92 so that its longitudinal axis is coaxial with the central axis of the dial member 92. The central post 136 has an outer diameter which is substantially equal to the diameters of the central apertues 78, 108 and 112 formed in the disc member 26, the plate member 88 and the seal member 90, respectively, and is disposed within and extends through these central apertures 78, 108 and 112 so that its distal end is adjacent to the rearward end of the shoulder 84. An axial bore 138 is formed in the post 136 and is adapted to receive a screw 140. A washer 142 is disposed between the head 144 of the screw 140 and the distal end of the post and has a diameter greater than the diameter of the shoulder 84. A coil compresion spring 146 is disposed between the outer peripheral portion of the washer 142 and the rear surface 80 of the central portion 68 of the disc member 28. This spring-washer-post arrangement imparts a rearwardly directed biasing force to the head of the screw 140 and thus to the dial member 92 and assists in urging and holding the dial assembly 30 in abuttment against the disc member 28. However, the spring-washer-post arrangement does permit the user of the showerhead 20 to rotate the dial assembly 30 about its central axis and with respect to the disc member 28 and the housing 26 so that the user can bring a nozzle aperture 110 into full or partial registry with the first aperture 86 and thereby allow water to flow through the conduit 66, the first aperture 86, the aligned nozzle aperture 110 and into the associated spray nozzle 122–28 to be sprayed therefrom.

Figure 7:
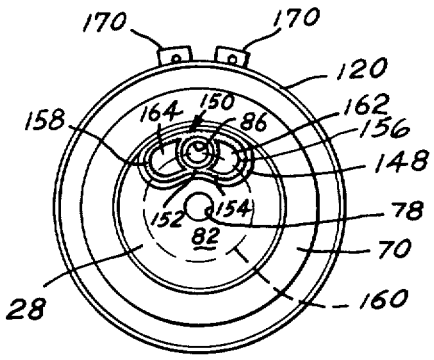
FIG. 7 is a cross-sectional view taken along the line 7—7 in FIG. 5.
Figure 9:
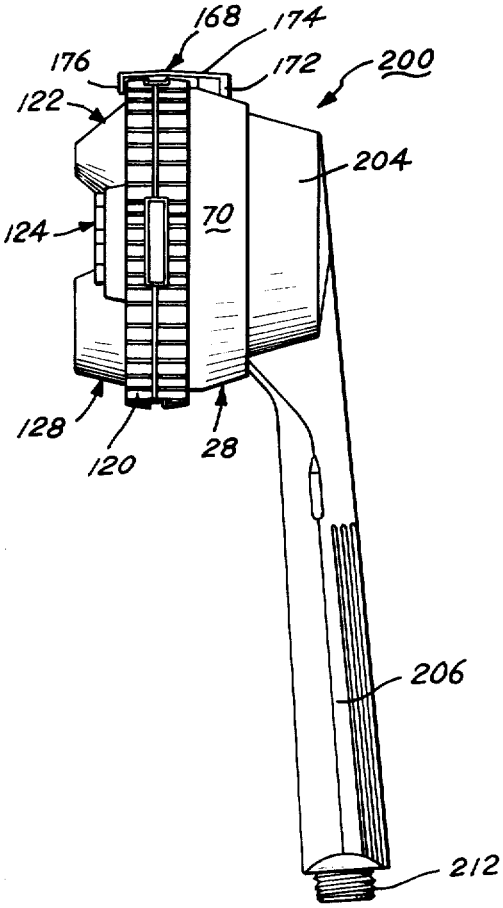
FIG. 9 is a side elevational view of the improved showerhead shown in FIG. 8.
Figure 10:
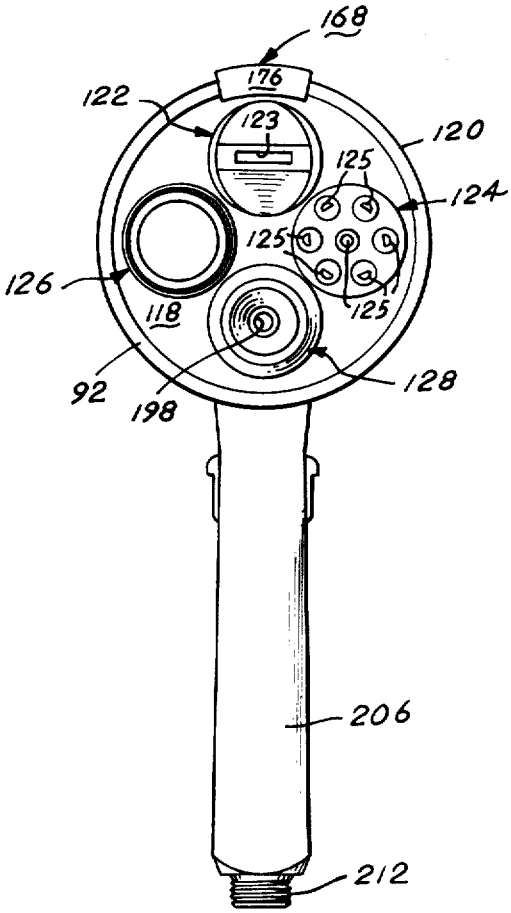
FIG. 10 is a front elevational view of the improved showerhead shown in FIG. 8.

The front surface 82 of the disc member 28 has a fowardly extending, raised portion 148 formed adjacent to the first aperture 86. As best shown in FIG. 7, a novel "butterfly" seal 150 is disposed within a groove 152 in this raised portion 148, and is formed from a continuous piece of, for example, a natural gum rubber composition or isoprene. The "butterfly" seal 150 includes an intergral first portion 154, a second portion 156 and a third portion 158. The first portion 154 of the seal 150 completely encircles the first aperture 86. The second portion 156 extends from the first portion 154 in a clockwise direction along the nozzle aperture's 110 path of travel that is shown generally at 160 in FIG. 7 and that is defined by the path which central axes of the nozzle apertures 110 follow as the dial assembly 30 is moved relative to the disc member 28. The second portion 156 surrounds and defines a first isolated area 162 of the raised portion 148. This area 162 has a configuration and size generally similar to the cross-sectional area of the nozzle apertures 110. The third portion 158 of the "butterfly" seal 150 extends from the first portion 154 in a counterclockwise direction along the path of travel 160. The third portion 158 defines a second isolated area 164 of the raised portion 148, and this second area 164, like the first isolated area 162, has a generally circular configuration and includes an area generally equal to the cross-sectional area of the nozzle apertures 110. In this regard, the second and third portions 156 and 158 of the "butterfly" seal 150 are arranged so that when a nozzle aperture 110 is positioned just adjacent to either side of, but not in fluid communication with, i.e., not in registry with, the first aperture 86, the nozzle aperture 110 is completely surrounded by at least a portion of the seal 150. Thus, this arrangement assures that the "butterfly" seal 150 will provide a complete seal around the apertures 86 and 110 whenever there is fluid commnication between a nozzle aperture 110 and the first aperture 86, and accordingly substantially eliminates any possibility of leakage between the front surface 82 of the disc member 28 and the rear surface 94 of the plate member 88.

A conventional O-ring 166 is positioned about the center post 136 between the front surface 82 of the disc member 28 and the rear surface 94 of the plate member 88. This O-ring 166 serves to prevent any leakage of water between the post 136 and the central aperture 78 in the disc member 28.

When there is no, or even incomplete, registry between the first aperture 86 and a nozzle aperture 110 and when the showerhead 20 is connected with a source of water under pressure the water in the conduit 66 and particularly the water in the first aperture 86 will impart a forwardly directed force on the rear surface 94 of the plate member 88. This forwardly directed force tends to separate the dial assembly 30 from the disc member 28. To counteract this forwardly directed force, the latch 168 is mounted on the outer side portion 70 of the disc member 28. In this regard, a pair of radially outwardly directed ears 170 are formed on and project outwardly from the outer side edge 72 of the disc member 28 adjacent to the first aperture 86, i.e., the ears 170 are generally disposed in a radial plane that is the same as the radial plane which includes the central axes of the first aperture 86 and the central aperture 68 of the disc member 28. The latch 168 includes a mounting end 172, and intermediate portion 174 and a distal end 176. A pair of screws 178 secure the mounting end 172 of the latch to the rearwardly facing surfaces of the ears 170. The intermediate portion 174 extends forwardly from the mounting end 172 and overlies and is radially spaced from the outer peripheral side edge 120 of the dial member 92. The distal end 176 extends radially inwardly from the forward end of the intermediate portion 174 and includes a rearwardly projecting dimple 180 which abuts a portion of the front surface 118 of the dial member 92. While such abuttment between the dimple 180 and the front surface 118 does not prevent rotational movement of the dial assembly 30, this abuttment does prevent the dial assembly 30 from being moved or "canted" forwardly away from the front surface 82 of the disc member 28 due to the forwardly directed force of the water in the first aperture 86.

The latch 168 also serves as a means to indicate to a user of the showerhead 20 when a nozzle aperture 110 is aligned with the first aperture 86 of the disc member, more specifically, when one of the spray nozzles 122–28 is movedin into alignment with the distal end 176 of the latch 168, the nozzle aperture 110 associated with that spray nozzle will, in turn, be aligned or in registry with the first aperture 86. To facilitate the latch 168 serving as an indicator, the distal end portion 176 and the front surface 118 may also include indicia which will assist the user in aligning the spray nozzles 122–28 with the distal end 176.

As noted above, the spray nozzle 138 provides a pulsating, invigorating discharge or spray which is obtained without the use of any mechanical or rotary mechanism. While we are not sure as to exactly why spray nozzle 128 provides its pulsating discharge, we believe that this discharge is due to the turbulence of the water in the nozzle 128 immediately prior to its being discharged therefrom and that such water turbulence occurs as a result of the specific structure and structural arrangement of the nozzle 128 and the relationship between the nozzle 128 and the nozzle aperture 110 associated therewith. In this regard, the spray nozzle 128 includes an outer, generally conical wall 182, an inner, conical wall 184 and a discharge orifice wall 186. The walls 182, 184 and 186, together with the front surface 106 of the plate member 88 (more precisely front surface of the seal member 90) define a turbulence cavity 188 within the spray nozzle 128. The outer, conical wall 182 has its larger diameter end 190 adjacent to the rear surface 116 of the dial member 92 and has its smaller diameter end 192 adjacent to, but disposed forwardly of, the front surface 118 of the member 92. The larger diameter end 194 of the inner conical wall 184 is disposed adjacent to and is integrally connected with the smaller diameter end 192 of the outer wall 182. The smaller diameter end 196 of the inner conical wall 184 is disposed within the turbulence chamber 188 approximately midway between the ends 190 and 192 of the outer conical wall 184. The smaller diameter end 196 of the inner conical wall 184 is integrally connected with the discharge orifice wall 186. The discharge orifice wall 186 includes a centrally disposed circular discharge orifice 198 whose central axis is parallel to but offset from the central axis of the nozzle aperture 110 associated with the spray nozzle 128.

As noted above, actual tests have shown that the structure and structural arrangement of the spray nozzle 128 provide a pulsating spray from the discharge orifice 198 when the showerhead 20 is used with a source of water under pressure, such as found in most communities in the United States. The showerheads that have been tested were substantially identical to the showerhead 20 described hereinabove. In these tested showerheads, the central axis of the orifice 198 was 1.00 inches from the central axis of the dial member 92, and the diameter of the orifice 198 and ¼ inches. The smaller diameter end 192 of the outer wall 182 was spaced ⅜ inches forwardly of the larger diameter end 190, and the smaller diameter end 196 of the inner wall 184 was spaced ½ inches rearwardly from the larger diameter end 194. The discharge orifice wall 186 had a diameter of 5/16 inches. The larger diameter end 190 of the outer wall 182 had a diameter 1¼ inches while the smaller diameter end 192 had a diameter of 1.0 inches. The distance between the central axis of the central aperture 108 of the plate member 88 and the central axis of the nozzle aperture 110, associated with the spray nozzle 128, is 0.76 inches, and thus the distance between the central axis of the orifice 198 and the nozzle aperture 110 was ¼ inches in the tested showerhead. Other tests have disclosed that the distance between the central axis of the orifice 198 and the nozzle aperture 110 can be varied from ⅛ inches to ½ inches without the loss of a noticeable pulsation in the discharge of the spray nozzle 128. However, when the distance between the central axis of the orifice 198 and the aperture 110 was reduced to 1/16 inches, only slight pulsation occurred and when the axis of the orifice 198 and the nozzle aperture 110 were aligned, there was no pulsation. Moreover the tests disclosed that optimum pulsation occurred when the distance between the central axis of the orifice 198 and the aperture 110 [and] *was* ⅜ inches although good pulsation occurred when this distance was *between* ¼ inches and ½ inches.

Referring now to FIGS. 8–11, 13A and 13B, another showerhead embodying the principles of our invention is shown generally at 200. The principal difference between the showerheads 20 and 200 is that the latter is designed to be held in the user's hand during usage while the former is designed to be mounted on a wall. Aside from the manner of usage, there are no functional differences between the two showerheads 20 and 200 and the only structural differences relate to the fact that a combined handle-housing 202 is employed with the showerhead 200 instead of the housing 26 which is employed with the showerhead 20. For this reason, the specific description of the showerhead 200 will be limited to a description of the structural differences between the showerheads 20 and 200.

As already noted, the housing 26, including the inner and outer members 32 and 52 and the ball swivel joint 42, are not utilized in the showerhead 200. Rather, however, a combined handle-housing 202 is utilized in their place. The handle-housing 202 includes a main body 204 positioned adjacent to the rear surface of the disc member 28 and an integral handle 206 which extends from the main body portion 204 at an angle to the central axis of the disc member 28 and the dial assembly 30. A conduit 208 is formed in the handle 206 and extends from its lower distal end 210 of the handle portion 206 to its other end adjacent to the main body 204. The lower distal end 210 of the handle 206 has a threaded portion 212 formed thereon.

Figures 8, 11:
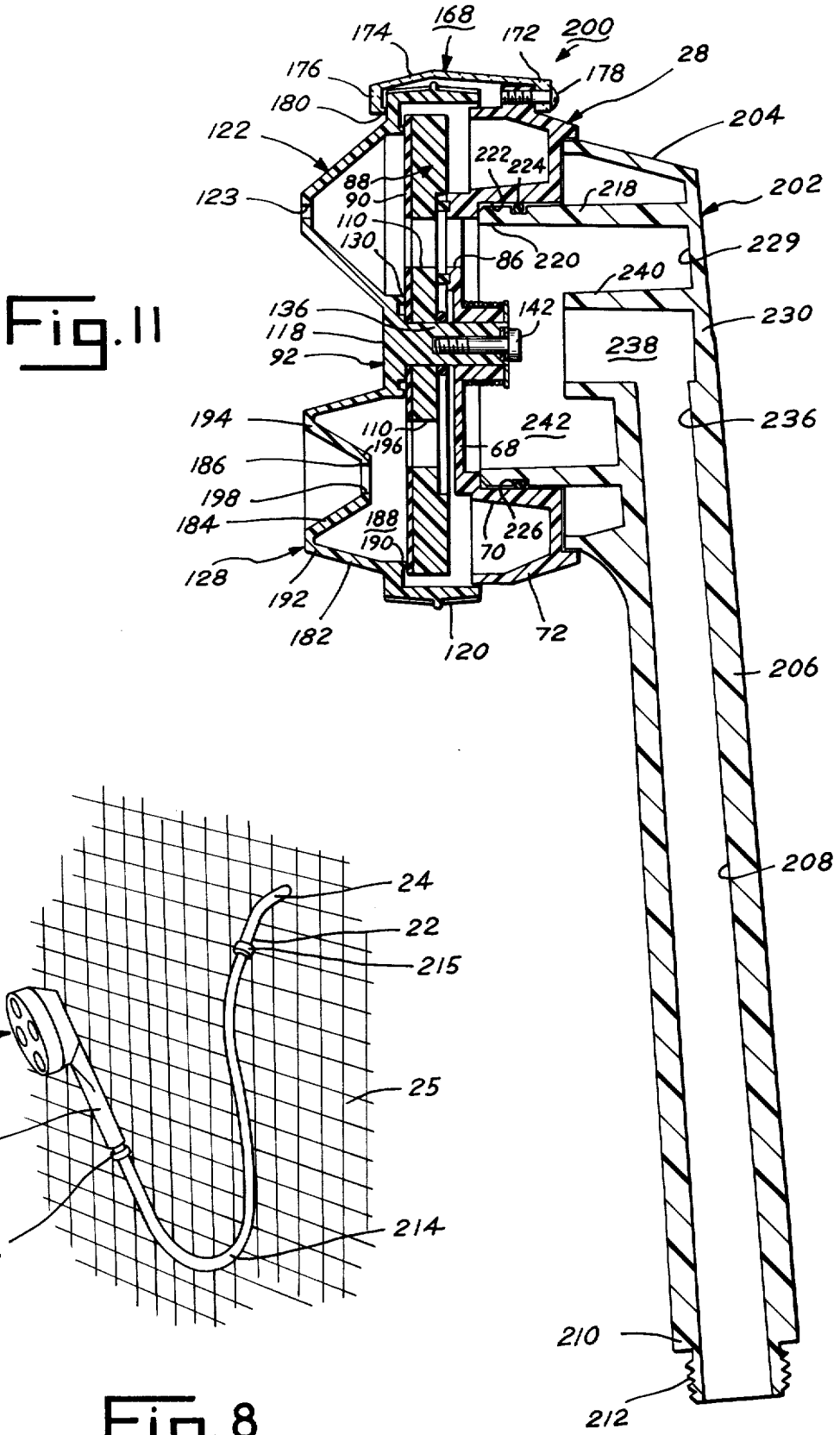
FIG. 8 is a perspective view showing another, hand-held embodiment of the improved showerhead of our present inention which is shown connected, by means of a flexible hose, to the end of a conventional shower arm pipe.
FIG. 11 is a vertical cross-sectional view taken through the center of the showerhead shown in FIG. 8.
Figure 12:
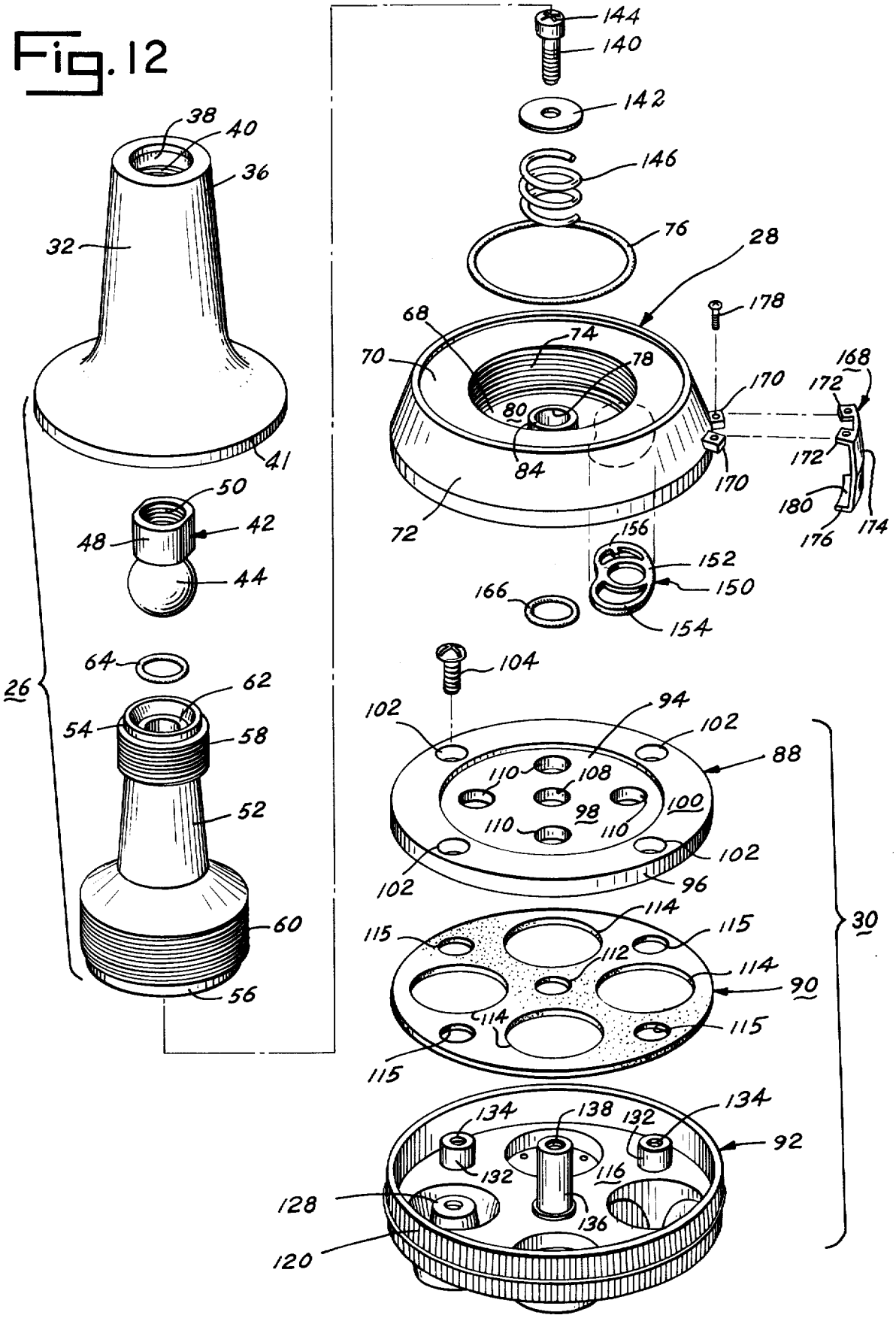
FIG. 12 is an exploded view showing the components of the improved showerhead shown in FIG. 2.
Figure 13A:
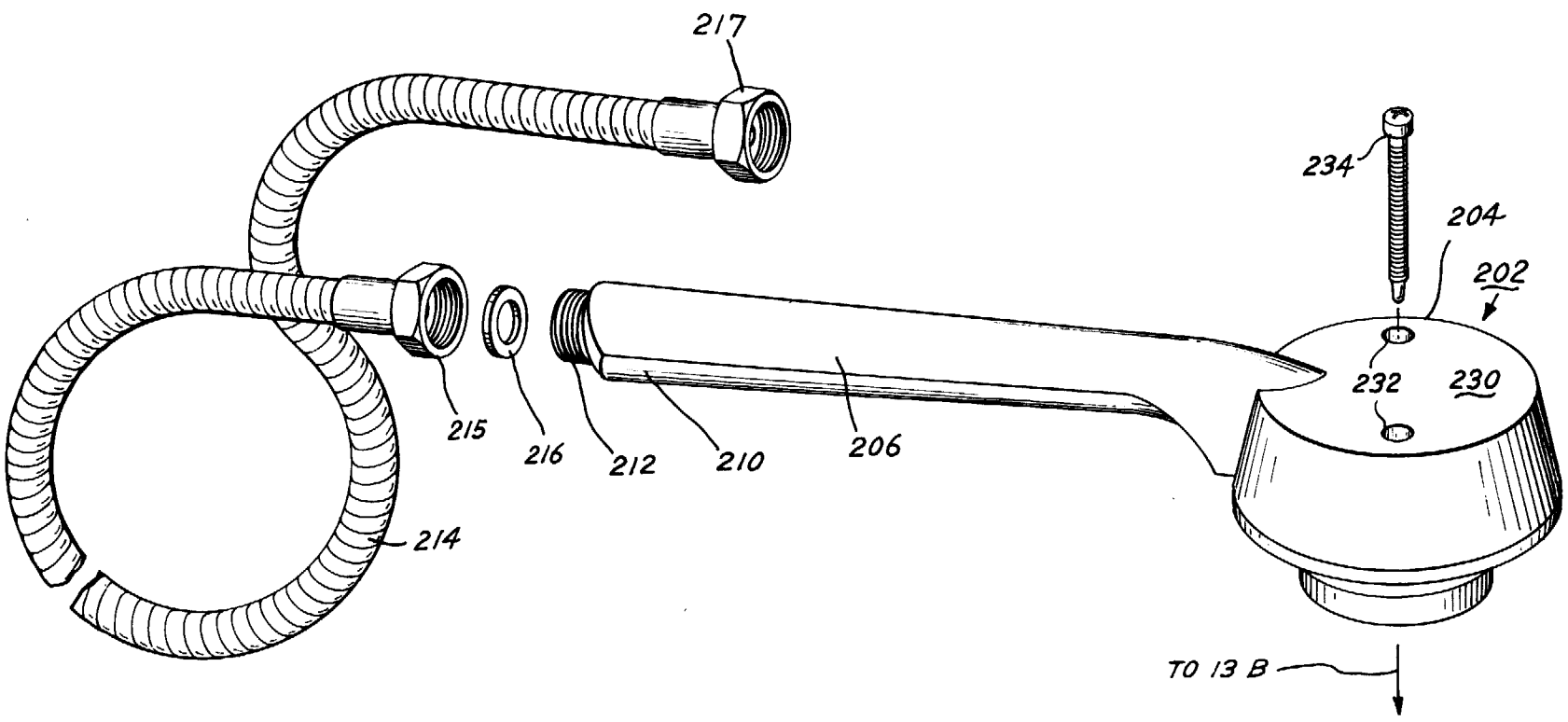
FIGS. 13A and 13B are an exploded view showing the components of the improved showerhead shown in FIG. 8.

As seen in FIGS. 8 and 13A, the lower distal end 210 of the handle portion 206 is designed to be connected with one end of a conventional flexible hose 214 and in this regard, a nut 215, carried by the end of the hose 214, is threaded onto the threaded portion 212. A conventional rubber or plastic washer 216 is disposed between the end 210 and the nut 215 to provide a water seal therebetween. The other end of the hose 214 is connected with the threaded distal end 22 of a shower arm pipe 24 normally found in bathrooms and the like by means of a nut 217 also carried by the hose 214.

As best shown in FIG. 11, the main body 204 includes a first cylindrical wall 218 whose central axis is coaxial with the central axis of the disc member 28. The forward end 220 of the wall 218 is snuggly fit within the inner, annular surface 222 formed on the outer portion 70 of the disc member 28. In this regard, it should be noted that the disc member 28 is modified by eliminating the threaded portion 74 when the disc member 28 is utilized with the showerhead 200. A conventional O-ring 224 is enclosed in an outwardly opening recess 226 formed in the end 220 of the wall 218 and provides a seal between the outer surface of the wall 218 and the surface 222 of the outer portion 70.

Figure 13B:
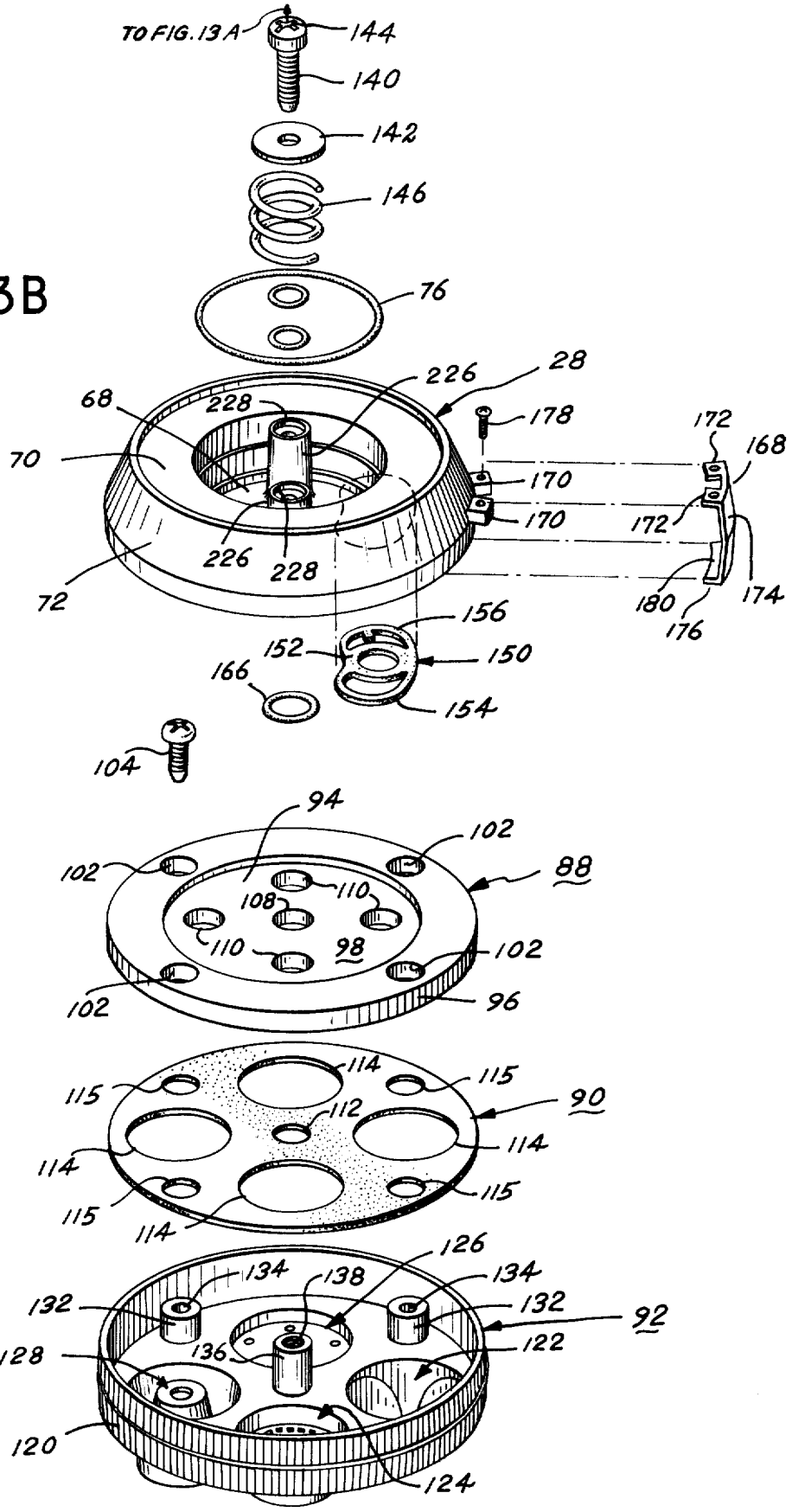

As seen in FIG. 13B, the disc member 28, when utilized with the showerhead 200, includes two integral, rearwardly extending posts 226 which are disposed on diametrically opposite sides of the central aperture 78 and which are spaced 90° from the first aperture 86. The distal ends 228 of these posts 226 are positioned adjacent to the [forwad] *forward* surface 229 of the back wall 230 of the main body 204 and are aligned with two holes 232 formed in the back wall 230. Screws 234 are disposed in the holes 232 and are threaded into the counterbores formed in the distal ends 228 of the posts 226 so as to secure the handle-housing 222 to the disc member 28.

The upper end 236 of the conduit 208 communicates with a cylindrical chamber 238 which is defined by a second cylindrical wall 240 in the main body 204 and whose central axis is coaxial with the central axis of the disc member 28. The front end of the chamber 238 is open so that water flowing through the conduit 208, and into the chamber 238, may then flow into the interior of the chamber 242 defined by the wall 218. Thereafter and as in showerhead 20, the water flow through the first aperture 86 and an aligned nozzle aperture 110 and out through the associated spray nozzle 122–28.

In view of the foregoing, it should be apparent to those having skill in this art that the person may use the showerheads 20 or 200 by simply turning on a valve such as a conventional faucet so that water will flow out of the shower arm pipe 24. The user may then rotate the dial assembly 30 about its central axis and with respect to the rest of the showerhead, so as to select which of the spray nozzles 122–28 water will be discharged through. Moreover, if so desired, the user may change from one spray nozzle to another during the course of using the showerhead by simply again rotating the dial assembly 30 with respect to the rest of the showerhead. If the user of the showerhead wishes to reduce the volume of the water being discharged, he may adjust the dial assembly 30 so that there is only a partial registry between the first aperture 86 and a nozzle aperture 110, with the degree of registry determining of course, the volume of flow therethrough. Because of the utilization of the novel "butterfly" seal 150, leakage will not occur between the plate member 88 and the disc member 28 even when there is partial registry between the first aperture 86 and a nozzle aperture 110.

One of the advantages, from the standpoint of commercializing the improved showerheads 20 and 200, is that all of the principal components of the showerheads, e.g., housing 26 (except for the swivel joint 42), the disc member 28, the plate member 88, the dial member 92 and the latch 68 in the showerhead 20 as well as the handle-housing 202 in the showerhead 200, may be made from plastic materials and may be molded using conventional molding techniques. This significantly reduces the cost of manufacturing these components and, therefore, reduces the overall cost of the showerheads with the net result that an excellently functioning showerhead, having a commercially pleasing appearance, can be manufactured at a relatively small overall cost.

In view of the foregoing, it should be apparent to those having ordinary skill in the art, that the showerheads 20 and 200 could be modified or changed without departing from the principles of our invention. For example, fewer or more spray nozzles could be employed and could have different configurations. In addition the latch could be modified so that it did not project beyond the [oter] *other* side edge 120 of the dial assembly 30. Thus, since our invention disclosed herein may be embodied in other specific forms without departing from the spirit or central characteristics thereof, the preferred embodiments described herein are to be considered in all respects as illustrative and not restrictive, the scope of the invention being indicated by the appended claims, rather than by the foregoing descriptions, and all changes which come within the meaning and range of equivalency of the claims are therefore intended to be embraced therein.

We claim:

1. An improved showerhead having at least two spray nozzles and being adapted to be connected with a source of water under pressure and to permit the user to select the spray nozzle through which water is to be discharged, the improved showerhead comprising:

a housing including means which defines a conduit through which water may flow and having a first end and a second end which may be connected with the source of water under pressure and which communicates with the conduit means so that water from the source may flow through the conduit means;

a disc member having a front surface, a rear surface and an outer peripheral edge and being connected with the first end of the housing so that the water flowing in the conduit means communicates with the [near] *rear* surface of the disc member, the disc member having a central, circular aperture formed therein so that the central axes of the central aperture and of the disc member are coaxial and having a first, offset aperture formed therein between the central aperture and the outer peripheral edge of the disc member so that the central axis of the first aperture is parallel to the central axis of the disc member, with both the central aperture and the first aperture extending through the disc member from its front surface to its rear surface;

a shoulder formed around the central aperture on the rear surface of the disc member and projecting rearwardly so as to define a rearward continuation of the central aperture;

a dial assembly connected with the housing and including a dial member, a plate and a seal;

the dial member having a front surface, a rear surface and an outer peripheral circular side edge that extends rearwardly from the rear surface of the dial member, the dial member also having at least two spaced, separate spray nozzles formed therein and opening forwardly therefrom so that water may be sprayed, through a spray nozzle, from the front of the dial member;

the plate having a front surface, a rear surface, an outer peripheral, circular edge whose diameter is less than the diameter of the outer peripheral edge of the dial member and whose thickness, parallel to the central axis of the plate, is less than the length of the rearward extension of the outer peripheral edge of the dial member, the plate also including a circular, central aperture whose central axis is coaxial with the central axis of the plate and offset nozzle apertures, one for each of the spray nozzles, disposed between the central axis and the outer peripheral edge of the plate so that the radial distance between the central axis of each spray aperture and the central axis of the plate is equal to the radial distance between the central axis of the first aperture and the central axis of the central aperture of the disc member;

a rearwardly projecting post formed on the rear surface of the dial member so that its central axis is coaxial with the central axis of the dial member, the post having an outer diameter substantially equal to that of the central apertures of the disc member and the plate and having a length greater than the thickness of the plate but less than the combined thicknesses of the plate and the length of the shoulder on the disc member, with the post projecting through the central aperture of the plate and into the central aperture of the disc member so that the front surface of the plate is adjacent to the rear surface of the dial member, so that the rear surface of the plate is adjacent to the front surface of the disc member and so that the distal end of the post is journaled in the central aperture of the disc member whereby the dial member and plate may be rotated relatively to the disc member, about their coaxial central axis, and thus the nozzle apertures may be moved into and out of registry with the first aperture of the disc member;

the seal being disposed between the rear surface of the dial member and the front surface of the plate for preventing leakage therebetween;

means for preventing relative movement between the dial member and the plate and for aligning each offset aperture of the plate with a spray nozzle;

means mounted in the distal end of the post for biasing the dial assembly rearwardly with respect to the disc member;

sealing means for preventing water from leaking between the rear surface of the plate and the front surface of the disc member when the first aperture and a nozzle aperture are in registry, the sealing means being mounted on the front surface of the disc member and disposed between the rear surface of the plate and the front surface of the disc member, the sealing means including a first portion, a second portion and a third portion, with the first portion of the sealing means extending completely around the first aperture, with the second portion of the sealing means extending from the first portion in one direction along the path of travel of the nozzle apertures, as the dial assembly is moved with respect to the disc member, and defining a first isolated area which is generally similar in shape and dimensions to the shape and dimensions of the nozzle apertures in the plate so that when a nozzle aperture in the plate is positioned adjacent to one side of but not in fluid communication with the first aperture, the second portion of the sealing means is disposed about the nozzle aperture, and with the third portion of the sealing means extending, from the first portion in the other direction along the path of travel and defining a second isolated area which is generally similar in shape and dimensions to the shape and dimensions of the nozzle apertures in the plate so that when a nozzle aperture in the plate is positioned adjacent to the other side of but not in fluid communication with the first aperture, the third portion of the sealing means is disposed about the nozzle aperture; and means for latching the dial assembly to the disc member so that the rear surface of the plate is retained in position adjacent to the front surface of the disc member and so that the sealing means is retained in sealing relationship between the rear surface of the plate and the front of the disc member surface, the latch means being mounted on the outer peripheral edge of the disc member adjacent to the first aperture and including an intermediate portion and a distal end portion, with the intermediate portion extending from the disc member over the outer peripheral edge of the dial member and with the distal end portion abutting a portion of the front surface of the dial member.

2. The improved showerhead described in claim 1 wherein the housing is [tunbular] *tubular*;wherein the disc member has an annular portion spaced to the rear of its rear surface; wherein internal threads are formed on the annular portion; wherein the second end of the housing includes internal threads and a recess formed therein; wherein a ball swivel member is disposed within the recess and is adapted to be connected with the source of water; and wherein the conduit means includes a tubular member having an externally threaded front end that engages the threads on the annular portion of the disc member and an externally threaded rear end that engages the threads on the second end of the housing, the rear end of the tubular member also contacting the ball swivel member so as to retain the ball swivel member in the recess.

3. The improved showerhead described in claim 2 including an interference fit between the threads on the front end of the tubular member and in the annular portion of the disc member and between the threads on the rear end of the tubular member and on the second end of the housing so to minimize the leakage of water therebetween.

4. The improved showerhead described in claim 1 wherein the housing includes a handle for holding the showerhead; and wherein the second end of the housing has external threads formed thereon for connecting the housing to a flexible conduit which, in turn, is connected with the source of water under pressure.

5. The improved showerhead described in claim 1 wherein the first aperture and one of the nozzle apertures have the same diameter and define an initial continuous flow path for the water; wherein the spray nozzle associated with the one nozzle aperture has an outer conical wall, an inner conical wall and a discharge orifice wall which together with the rear surface of the plate define a turbulence cavity; wherein the discharge orifice wall has a discharge orifice therein through which the water being sprayed is emitted; wherein the central axes of the outer conical wall, the inner conical wall and the discharge orifice are coaxial and are offset from but parallel to the central axes of the one nozzle aperture; wherein the plane of the discharge orifice wall is transverse to the central axes of the outer conical wall, the inner conical wall and the discharge orifice; wherein the outer conical wall has its one, larger diameter end disposed adjacent to the rear surface of the plate and has its second, smaller diameter end disposed adjacent to the front surface of the dial member; wherein the inner conical wall is disposed generally within the outer conical wall and has its first, larger diameter end disposed adjacent to and connected with the second smaller diameter end of the outer conical wall and has its second, smaller diameter end disposed within the turbulence cavity and between the first and second ends of the outer conical wall; and wherein the discharge orifice wall extends across, and except for the discharge orifice therein, closes the second, smaller diameter end of the inner conical wall.

6. An improved showerhead having at least two spray nozzles and being adapted to be connected with a source of water under pressure and to permit the user to select the spray nozzle through which water is to be discharged, the improved showerhead comprising:

a housing including means which defines a conduit through which water may flow and having a first end which is connected with the source of water under pressure and which communicates with the conduit means so that water from the source can flow through the conduit means;

a disc member having a first surface and a second surface and being connected with the housing so that the water flowing in the conduit means comes in contact with at least a portion of the first surface of the disc member, the disc member having a first aperture disposed therein and extending therethrough between the portion of the first surface and the second surface;

a dial assembly including a first end and a second end and being connected with the disc member so that the second end of the dial assembly is adjacent to the second surface of the disc member, with the first end of the dial assembly including at least two spaced, separate spray nozzles adapted to have water selectively sprayed therethrough and with the second end of the dial assembly including a surface that is positioned adjacent to the second surface of the disc member, the second end surface of the dial assembly having nozzle apertures, one for each of the spray nozzles, disposed therein and arranged so that a nozzle aperture communicates with each of the spray nozzles;

means for permitting relative movement, along a predetermined path of travel, between the nozzle apertures disposed in the second end surface of the dial assembly and the first aperture disposed in the disc member so that as a result of relative movement along the path of travel, a nozzle aperture in the second end surface may be selectively moved into and out of registry with the first aperture thereby permitting, when a nozzle aperture is in registry with the first aperture, water to flow from the conduit means through the first nozzle which is in communication with the nozzle aperture; and sealing means for preventing water from leaking between the second end surface of the dial assembly and the second surface of the disc member both during registry and non-registry between a nozzle aperture and the front aperture and when the nozzle apertures in the second end surface are being moved along the path of travel, the sealing means being disposed between the second surface of the disc member and including a first portion, a second portion and a third portion, with the first portion of the sealing means extending completely around the first aperture, with the second portion of the sealing means extending, from the first portion, in one direction along the path of travel and defining a first isolated area which is generally similar in shape and dimensions to the shape and dimensions of the nozzle apertures in the second end surface so that when a nozzle aperture in the second end surface is positioned adjacent to one side of but not in registry with the first aperture, the second portion of the sealing means is disposed completely about the nozzle aperture, and with the third portion of the sealing means extending, from the first portion, in the other direction along the path of travel and defining a second isolated area which is generally similar in shape and dimensions to the shape and dimensions of the nozzle apertures in the second end surface so that when a nozzle aperture in the second end surface is positioned adjacent to the other side of but not in registry with the first aperture, the third portion of the sealing means is disposed completely about the nozzle aperture.

7. The improved showerhead described in claim 6 wherein the dial assembly is movable with respect to the disc member.

8. The improved showerhead described in claim 6 wherein the dial assembly is rotatable about its central axis which is coaxial with the central axes of the disc member and the housing; and wherein the path of travel is generally circular.

9. The improved showerhead described in claim 6 wherein the second surface of the disc member and the second end surface of the dial assembly are substantially parallel.

10. The improved showerhead described in claim 6 wherein the sealing means is mounted on the second surface of the disc.

11. The improved showerhead described in claim 6 wherein the center of the first isolated area and the center of the second isolated area lie on the path of travel.

12. The improved showerhead described in claim 6 wherein the first aperture and the nozzle apertures are circular and have substantially the same diameter; wherein the axes of the nozzle apertures and the first aperture are parallel; and wherein the second end surface and the second surface are parallel and are transverse to the central axes of the nozzle apertures and the first aperture.

13. The improved showerhead described in claim 6 wherein the disc member and the dial assembly each have an outer peripheral side edge; wherein the first aperture is disposed between the central axis and the outer peripheral edge of the disc member; wherein latch means are mounted on the outer peripheral side edge of the disc member adjacent to the first aperture and includes an intermediate portion and a distal end portion; wherein the intermediate portion of the latch means extends from the disc member over the outer peripheral side edge of the dial assembly; wherein the distal end portion of the latch means abuts the first end of the dial assembly so as to maintain the second end surface of the dial assembly positioned adjacent to the portion second surface adjacent to the first aperture.

14. The improved showerhead described in claim 13 wherein the outer peripheral side edge of the dial assembly has a circular configuration; wherein the dial assembly is rotatable about its central axis which is coaxial with the central axis of the disc member; wherein the intermediate portion of the latch means is spaced radially outwardly from the outer peripheral side edge of the dial assembly so that the intermediate portion does not contact the outer peripheral side edge of the dial assembly; and wherein the distal end portion of the latch means also serves as an indicator for aligning a spray nozzle and thus its nozzle aperture, with the first aperture.

15. The improved showerhead described in claim 6 wherein the first aperture and one of the nozzle apertures are circular, have the same diameters and define an initial continuous flow path for the water; wherein the spray nozzle associated with the one nozzle aperture has an outer conical wall, an inner conical wall and a discharge orifice wall which together with the second end of the dial assembly, define a turbulence cavity; wherein the discharge orifice wall has a discharge orifice therein through which the water being sprayed is emitted; wherein the central axes of the outer conical wall, the inner conical wall and the discharge orifice are coaxial and are offset from but parallel to the central axes of the one nozzle aperture; wherein the plane of the discharge opening wall being transverse to the central axes of the outer conical wall, the inner conical wall and the discharge orifice; wherein the outer conical wall has its first, large diameter end disposed adjacent to the second end of the dial assembly and has its second, smaller diameter end disposed adjacent to the first end of the dial assembly; wherein the inner conical wall is disposed generally within the outer conical wall and has its first, large diameter end disposed adjacent to and connected with the second, smaller diameter end of the outer conical wall and has its second, smaller diameter end disposed within the turbulence cavity and between the first and second ends of the outer conical wall; and wherein the discharge orifice wall extends across, and except for the discharge orifice therein, closes the second, smaller diameter end of the inner conical wall.

16. An improved showerhead having at least two spray nozzles and being adapted to be connected with a source of water under pressure and to permit the user to select the spray nozzle through which water is to be discharged, the improved showerhead comprising:

a housing including means which defines a conduit through which water may flow and having a first end which is connected with the source of water under pressure and which communicates with the conduit means so that water from the source can flow through the conduit means;

a disc member having a first surface, a second surface and an outer peripheral side edge and being connected with the housing so that the water flowing in the conduit means comes in contact with at least a portion of the first surface of the disc member, the disc member having a first aperture disposed therein between the central axis and the outer peripheral edge, the first aperture extending therethrough between the portion of the first surface and the second surface;

a dial assembly including a first end, a second end and an outer peripheral side edge, the dial assembly being connected with the disc member so that the second end of the dial assembly is adjacent to the second surface of the disc member, with the first end of the dial assembly including at least two spaced, separate spray nozzles which are adapted to have water selectively sprayed therethrough and with the second end of the dial assembly including a surface that is positioned adjacent to the second surface of the disc member, the second end surface of the dial assembly having nozzle apertures, one for each of the spray nozzles, formed therein and arranged so that a nozzle aperture communicates with each of the spray nozzles;

means for permitting relative movement, along a predetermined path of travel, between the nozzle apertures disposed in the second end surface of the dial assembly and the first aperture disposed in the disc member so that as a result of relative movement along the path of travel, a nozzle aperture in the second end surface may be selectively moved into and out of registry with the first aperture in the disc member thereby permitting water to flow from the conduit means through the first aperture and the nozzle aperture and then out of the spray nozzle which is in communication with the nozzle aperture;

sealing means for preventing water from leaking out between the second end surface of the dial assembly and the second surface of the disc member, both during registry and non-registry between the first aperture and a nozzle aperture in the second end surface and when the nozzle apertures in the second end surface are being moved along the path of travel, the sealing means being disposed between the second end surface of the dial assembly and the second surface of the disc member;

means for latching the dial assembly to the disc member so that the second end surface of the dial assembly is retained in position adjacent to the second surface of the disc member and so that the sealing means is retained in sealing relationship between the second end surface and the second surface, the latch means being mounted on the outer peripheral side edge of the disc member adjacent to the first aperture and including an intermediate portion and a distal end portion, with the intermediate portion extending from the disc member over the outer peripheral side edge of the dial assembly and with the distal end portion abutting a portion of the first end surface of the dial assembly.

17. The improved showerhead described in claim 16 wherein when the first aperture is in registry with a nozzle aperture, the central axes of these apertures are coaxial and are perpendicular to the plane of the portion of the first end of the dial assembly.

18. The improved showerhead described in claim 17 wherein the central axes of the nozzle apertures and the first aperture are parallel to each other and to the central axes of the dial assembly and the disc member.

19. The improved showerhead described in claim 16 wherein the outer peripheral side edge of the dial assembly has a circular configuration; wherein the path of travel is a circular arc about the central axis of the dial assembly; wherein the dial assembly may be moved, about its central axes, relatively to the disc member so as to bring a nozzle aperture into and out of registry with the first aperture of the disc member.

20. The improved showerhead described in claim 16 including means for indicating to the user of the showerhead when a nozzle aperture is in registry with the first aperture of the disc member.

21. The improved showerhead described in claim 20 wherein the distal end portion of the latching means serves as the indicating means and is disposed, with respect to the first aperture, so that when a spray nozzle is positioned adjacent to the distal end portion, the first aperture of the disc member is in registry with the nozzle apertures for the spray nozzle.

22. The improved showerhead described in claim 18 including means for indicating to the user of the showerhead when a nozzle aperture is in registry with the first aperture of the disc member, wherein the distal end portion of the latching means serves as the indicating means and is disposed, with respect to the first aperture, so that when a spray nozzle is positioned adjacent to the distal end portion, the first aperture is in registry with the nozzle aperture for the spray nozzle.

23. The improved showerhead described in claim 22 wherein the sealing means includes a first portion, a second portion and a third portion, with the first portion of the sealing means extending completely around the first aperture of the disc member, with the second portion of the sealing means extending from the first portion in one direction along the path of travel and defining a first isolated area which is generally similar in shape and dimensions to the shape and dimensions of the nozzle apertures in the second end surface so that when a nozzle aperture in the second end surface is relatively moved to a position adjacent to one side of but not in registry with the first aperture, the second portion of the sealing means is disposed completely about the nozzle aperture, and with the third portion of the sealing means extending, from the first portion, in the other direction along the path of travel and defining a second isolated area which is generally similar in shape and dimensions to the shape and dimensions of the nozzle apertures in the second end surface so that when a nozzle aperture in the second end surface is positioned adjacent to the other side of but not in registry with the first aperture, the third portion of the sealing means is disposed completely about the nozzle aperture.

24. The improved showerhead described in claim 23 wherein the second surface of the disc member and the second end surface of the dial assembly are substantially parallel; wherein the sealing means is mounted on the second surface of the disc member; and wherein the centers of the first and second isolated areas lie on the path of travel.

25. The improved showerhead described in claim 16 wherein the first aperture of the disc member and one of the nozzle apertures are circular, have the same diameters and define an initial continuous flow path for the water; wherein the spray nozzle associated with the one nozzle aperture has an outer conical wall, an inner conical wall and a discharge orifice wall which together with the second end of the dial assembly, define a turbulence cavity; wherein the discharge orifice wall has a discharge orifice therein through which the water being sprayed is emitted; wherein the central axes of the outer conical wall, the inner conical wall and the discharge orifice being coaxial and being offset from but parallel to the central axes of the one nozzle aperture; wherein the plane of the discharge orifice wall being transverse to the central axes of the outer conical wall, the inner conical wall and the discharge orifice; wherein the outer conical wall has its first, larger diameter end disposed adjacent to the second end of the dial assembly and has its second, smaller diameter end disposed adjacent to the first end of the dial assembly; wherein the inner conical wall is disposed generally within the outer conical wall and has its first, larger diameter end disposed adjacent to and connected with the second, smaller diameter end of the outer conical wall and has its second, smaller diameter end disposed within the turbulence cavity and between the first and second ends of the outer conical wall; and wherein the discharge orifice wall extends across, and except for the discharge orifice therein, closes the second, smaller diameter end of the inner conical wall.

26. An improved showerhead having at least one spray nozzle and being adapted to be connected with a source of water under pressure, the improved showerhead comprising:

a housing including means which defines a conduit through which water may flow and having a front end and a rear end which may be connected with the source of water under pressure and which communicates with the conduit means so that water from the source may flow through the conduit means from its rear end to its front end;

a disc member having a front surface and a rear surface and being connected with the front end of the housing so that the rear surface extends across and closes the front end of the housing and so that the water flowing in the conduit means communicates with the rear surface of the disc member, the disc member having a first circular aperture disposed therein and extending therethrough between the front surface and the rear surface, *with the central axis of the first aperture being substantially transverse to the plane of the disc member;* a nozzle assembly including a front end wall and a rear end wall and being connected with the disc member so that the rear end wall of the nozzle assembly is positioned adjacent to the front surface of the disc member, with the front end wall of the nozzle assembly including a spray nozzle which is adapted to emit a pulsating spray of water *from the showerhead in a direction substantially parallel with the central axis of the first aperture*; and with the rear end wall of the nozzle assembly having a circular nozzle aperture which has the same diameter as the first aperture and which is disposed so that its central axis is coaxial with the central axis of the first aperture and so that the nozzle aperture and the first aperture define an initial, continuous flow path for the water; the spray nozzle having an outer conical wall, an inner conical wall and a discharge orifice wall which, together *with* the rear end wall of the nozzle assembly, define a turbulence cavity *with the circular nozzle aperture having a small cross-sectional area relative to the area of the portion of the rear end wall that defines the tubulence cavity,* with the discharge orifice wall having a discharge orifice therein through which the water being sprayed is emitted, with the central axes of the outer conical wall, the inner conical wall and the discharge orifice being coaxial and being offset from but parallel to the central axis of the nozzle aperture *a distance of greater than 1/16 inches* and with the plane of the discharge orifice wall being transverse to the central axis of the outer conial wall, the inner conical wall and the discharge orifice *and to the central axes of the first aperture and the nozzle aperture*; the outer conical wall having its first, larger diameter end disposed adjacent to the rear end wall of the nozzle assembly and its second smaller diameter end disposed adjacent to the front end wall of the nozzle assembly; the inner conical wall being disposed generally within the outer conical wall and having its first, larger diameter end disposed adjacent to and connected with the second, smaller diameter end of the outer conical wall and its second, smaller diameter disposed within the turbulence cavity and between the first and second ends of the outer conical wall; the discharge orifice wall extending across, and except for the discharge orifice therein, closing the second, smaller diameter end of the inner conical wall.

27. The improved showerhead described in claim 26 wherein the disc member and nozzle assembly each have an outer peripheral side edge; wherein the showerhead also includes means for latching the nozzle assembly to the disc member so that the rear end wall of the nozzle assembly is retained in position adjacent to the front surface of the disc member; wherein the latch means are mounted on the outer peripheral edge of the disc member adjacent to the first aperture and including an intermediate portion and a distal end portion, with the intermediate portion extending from the disc member over the outer peripheral edge of the nozzle assembly member and with the distal end portion abutting a portion of the front surface of the dial member.

28. The improved showerhead described in claim 26 wherein the nozzle assembly may be rotated, relative to the disc member, about its central axis so that the nozzle aperture moves along a path of travel about the central axes of the nozzle assembly and so that as a result of this relative movement, the nozzle aperture may be selectively moved into and out of registry with the first aperture; and wherein sealing means for preventing water from leaking out between the rear end wall of the nozzle assembly and the first surface of the disc member are disposed between the rear end wall of the nozzle assembly and the front surface of the disc member; and wherein the sealing means includes a first portion, a second portion and a third portion, with the first portion of the sealing means extending completely around the first aperture of the disc member, with the second portion of the sealing means extending from the first portion in one direction along the path of travel and defining a first isolated area which is generally similar in shape and dimensions to the shape and dimensions of the nozzle aperture so that when the nozzle aperture is relatively moved to a position adjacent to one side of but not in registry with the first aperture, the second portion of the sealing means is disposed completely about the nozzle aperture, and with the third portion of the sealing means extending, from the first portion, in the other direction along the path of travel and defining a second isolated area which is generally similar in shape and dimensions to the shape and dimensions of the nozzle aperture so that when the nozzle aperture is positioned adjacent to the other side of but not in registry with the first aperture, the third portion of the sealing means is disposed completely about the nozzle aperture.

*29. An improved showerhead having at least two spray nozzles, being adapted to be connected with a source of water under pressure and to permit the user to select the spray nozzle through which water is to be discharged, and comprising:*

*a housing including means that defines a conduit through which water may flow and having a first end and a second end which may be connected with the source of water under pressure and which communicates with the conduit means so that water from the source may flow through the conduit means;*

*a disc member having a front surface, a rear surface and an outer peripheral edge and being associated with the first end of the housing so that the water flowing in the conduit means communicates with the rear surface of the disc member, the disc member having a central aperture formed therein so that the central axes of the central aperture and of the disc member are coaxial and having a first, offset aperture formed therein between the central aperture and the outer peripheral edge of the disc member so that the central axis of the first aperture is parallel to the central axis of the disc member, with both the central aperture and the first aperture extending through the disc member from its front surface to its rear surface;*

*a shoulder formed around the central aperture on the rear surface of the disc member and projecting rearwardly so as to define a rearward continuation of the central aperture;*

*a dial assembly associated with the housing and including a dial member, a dial plate and a seal;*

*the dial member having a front surface, a rear surface and an outer peripheral circular side edge that extends rearwardly from the rear surface of the dial member, the dial member also having at least two spaced, separate spray nozzles formed therein and opening forwardly therefrom so that water may be sprayed, through a spray nozzle, from the front of the dial member;*

*the dial plate having a front surface, a rear surface, an outer peripheral edge whose diameter is less than the diameter of the outer peripheral edge of the dial member and whose thickness, parallel to the central axis of the dial plate, is less than the length of the rearward extension of the outer peripheral edge of the dial member, the dial plate also including a central aperture, whose central axis is coaxial with the central axis of the dial plate, and offset nozzle apertures, one for each of the spray nozzles, disposed between the central axis and the outer peripheral edge of the dial plate so that the radial distance between the central axis of each spray aperture and the central axis of the dial plate is equal to the radial distance between the central axis of the first aperture and the central axis of the central aperture of the disc member;*

*a rearwardly projecting post formed on the rear surface of the dial member so that its central axis is coaxial*

*with the central axis of the dial member, the post having an outer diameter substantially equal to that of the central apertures of the disc member and the dial plate and having a length greater than the thickness of the dial plate, with the post projecting through the central aperture of the dial plate and into the central aperture of the disc member so that the front surface of the dial plate is adjacent to the rear surface of the dial member, so that the rear surface of the dial plate is adjacent to the front surface of the disc member and so that the distal end of the post is journaled in the central aperture of the disc member whereby the dial member and dial plate may be rotated, relatively to the disc member, about their coaxial central axes, and thus the nozzle apertures may be moved into and out of registry with the first aperture of the disc member;*

*the seal being disposed between the rear surface of the dial member and the front surface of the dial plate for preventing leakage therebetween;*

*means for preventing relative movement between the dial member and the dial plate and for aligning each offset aperture of the dial plate with a spray nozzle;*

*means mounted in the distal end of the post for biasing the dial assembly rearwardly with respect to the disc member;*

*sealing means for preventing water from leaking between the rear surface of the dial plate and the front surface of the disc member when the first aperture and a nozzle aperture are in registry and when a nozzle aperture is positioned adjacent to one side along the path of travel of the nozzle apertures, but is not in fluid communication with the first aperture, the sealing means being disposed between the front surface of the disc member and the rear surface of the dial plate, and including a first portion, a second portion and a third portion, with the first portion of the sealing means being disposed adjacent to the first aperture, with the second portion of the sealing means extending from the first portion in one direction along the path of travel of the nozzle apertures, as the dial assembly is moved with respect to the disc member, and defining, with and between the first aperture and the second portion, a first isolated area which is generally similar in shape and dimensions to the shape and dimensions of the nozzle apertures in the dial plate, with the third portion of the sealing means extending, from the first portion in the other direction along the path of travel and defining, with and between the first aperture and the third portion, a second isolated area which is generally similar in shape and dimensions to the shape and dimensions of the nozzle apertures in the plate, and with the first, second and third portions forming a continuous seal about the first and second isolated areas and the first aperture; and*

*means for indicating the relative rotative position of the dial assembly with respect to the disc member so as to enable a user of the improved showerhead to facilitate alignment of a spray nozzle in the dial assembly, and thus its nozzle aperture, with the first aperture, the indicating means being mounted on the outer peripheral edge of the disc member adjacent to the first aperture and including an intermediate portion and a distal end portion, with the intermediate portion extending from the disc member over the outer peripheral edge of the dial member and with the distal end portion being adjacent to a portion of the front surface of the dial member.*

*30. The improved showerhead described in claim 29 wherein the housing includes a handle for holding the showerhead; and wherein the second end of the housing has external threads formed thereon for connecting the housing to a flexible conduit which, in turn, is connected with the source of water under pressure.*

*31. An improved showerhead having at least two spray nozzles and being adapted to be connected with a source of water under pressure and to permit the user to select the spray nozzle through which water is to be discharged, and comprising:*

*housing means that defines a conduit through which water may flow and having a first end connected with the source of water under pressure so that water from the source can flow through the conduit;*

*a disc member having a first surface and a second surface and being associated with the housing means so that the water flowing in the conduit comes in contact with at least a portion of the first surface of the disc member, the disc member having a first aperture disposed therein and extending therethrough between the portion of the first surface and the second surface;*

*a dial assembly including a first end and a second end and being connected with the disc member so that the second end of the dial assembly is adjacent to the second surface of the disc member, with the first end of the dial assembly including at least two spaced, separate spray nozzles adapted to have water selectively sprayed therethrough and with the second end of the dial assembly including a surface that is positioned adjacent to the second surface of the disc member, the second end surface of the dial assembly having nozzle apertures, one for each of the spray nozzles, disposed therein and arranged so that a nozzle aperture communicates with each of the spray nozzles;*

*means for permitting relative movement, along a predetermined path of travel, between the nozzle apertures disposed in the second end surface of the dial assembly and the first aperture disposed in the disc member so that as a result of relative movement along the path of travel, a nozzle aperture in the second end surface may be selectively moved into and out of registry with the first aperture thereby permitting, when a nozzle aperture is in registry with the first aperture, water to flow from the conduit through the first aperture and the nozzle aperture and then out of the spray nozzle which is in communication with the nozzle aperture; and*

*sealing means for preventing water from leaking between the second end surface of the dial assembly and the second surface of the disc member, both when a nozzle aperture is in registry with first aperture and when a nozzle aperture is positioned adjacent to one side of, along the path of travel, but not in fluid communication with the first aperture, the sealing means being disposed between the second end surface of the dial assembly and the second surface of the disc member and including a first portion, a second portion and a third portion, with the first portion of the sealing means being disposed adjacent to the first aperture, with the second portion of the sealing means extending, from the first portion, in one direction along the path of travel and defining, with and between the first aperture and the second portion, a first isolated area which is generally similar in shape and dimensions to the shape and dimensions of the nozzle apertures in the second end surface so that when a nozzle aperture in the second end surface is positioned adjacent to one*

*side of, but not in registry with, the first aperture, the nozzle aperture is adjacent to and disposed within the first isolated area, and with the third portion of the sealing means extending, from the first portion, in the other direction along the path of travel and defining, with and between the first aperture and the third portion, a second isolated area which is generally similar in shape and dimensions to the shape and dimensions of the nozzle apertures in the second end surface so that when a nozzle aperture in the second end surface is positioned adjacent to the other side of but not in registry with the first aperture, the nozzle aperture is adjacent to and disposed within the second isolated area.*

*32. The improved showerhead described in claim 31 wherein the dial assembly is rotatable about its central axis which is coaxial with the central axes of the disc member and the housing; wherein the path of travel is generally circular; and wherein the first, second and third portions of the sealing means form a continuous seal about the first and second isolated areas and the first aperture.*

*33. The improved showerhead described in claim 32 wherein the second surface of the disc member and the second end surface of the dial assembly are substantially parallel; and wherein the sealing means is mounted on the second surface of the disc.*

*34. The improved showerhead described in claim 32 wherein the center of the first isolated area and the center of the second isolated area lie on the path of travel.*

*35. The improved showerhead described in claim 32 wherein the first aperture and the nozzle aperture are circular and have substantially the same diameter; wherein the axes of the nozzle aperture and the first aperture are parallel; and wherein the second end surface and the second surface are parallel and are transverse to the central axes of the nozzle apertures and the first aperture.*

*36. The improved showerhead described in claim 32 wherein the disc member and the dial assembly each have an outer peripheral side edge; wherein the first aperture is disposed between the central axis and the outer peripheral edge of the disc member; wherein means for indicating the relative rotative position of the dial assembly with respect to the disc member so as to enable a user of the improved showerhead to facilitate alignment of a spray nozzle, and thus its nozzle aperture, with the first aperture, the indicating means being mounted on the outer peripheral side edge of the disc member adjacent to the first aperture and includes an intermediate portion and a distal end portion; wherein the intermediate portion of the indicating means extends from the disc member over the outer peripheral side edge of the dial assembly; wherein the distal end portion of the indicating means is adjacent to the first end of the dial assembly.*

*37. The improved showerhead described in claim 32 wherein the first aperture and one of the nozzle apertures are circular, have the same diameters and define an initial continuous flow path for the water; wherein the spray nozzle associated with the one nozzle aperture has an outer conical wall, an inner conical wall and a discharge orifice wall which together with the second end of the dial assembly, define a turbulence cavity; wherein the discharge orifice wall has a discharge orifice therein through which the water being sprayed is emitted; wherein the central axes of the outer conical wall, the inner conical wall and the discharge orifice are coaxial and are offset from but parallel to the central axes of the one nozzle aperture; wherein the plane of the discharge opening wall being transverse to the central axes of the outer conical wall, the inner conical wall and the discharge orifice; wherein the outer conical wall has its first, larger diameter end disposed adjacent to the second end of the dial assembly and has its second, smaller diameter end disposed adjacent to the first end of the dial assembly; wherein the inner conical wall is disposed generally within the outer conical wall and has its first, larger diameter end disposed adjacent to and connected with the second, smaller diameter end of the outer conical wall and has its second, smaller diameter end disposed within the turbulence cavity and between the first and second ends of the outer conical wall; and wherein the discharge orifice wall extends across, and except for the discharge orifice therein, closes the second, smaller diameter end of the inner conical wall.*

*38. An improved showerhead having at least two spray nozzles and being adapted to be connected with a source of water under pressure and to permit the user to select the spray nozzle through which water is to be discharged, the improved showerhead comprising:*

*a housing including means which defines a conduit through which water may flow and having a first end which is connected with the source of water under pressure and which communicates with the conduit means so that water from the source can flow through the conduit means;*

*a disc member having a first surface, a second surface and an outer peripheral side edge and being connected with the housing so that the water flowing in the conduit means comes in contact with at least a portion of the first surface of the disc member, the disc member having a groove in the second surface, with the groove extending about the first aperture and from the first aperture along a predetermined path, and also having a first aperture disposed therein between the central axis and the outer peripheral edge, with the first aperture extending therethrough between the portion of the first surface and the second surface;*

*a dial assembly including a first end, a second end and an outer peripheral side edge, the dial assembly being connected with the disc member so that the second end of the dial assembly is adjacent to the second surface of the disc member, with the first end of the dial assembly including at least two spaced, separate spray nozzles which are adapted to have water selectively sprayed therethrough and with the second end of the dial assembly including a surface that is positioned adjacent to the second surface of the disc member, the second end surface of the dial assembly having nozzle apertures, one for each of the spray nozzles, formed therein and arranged so that a nozzle aperture communicates with each of the spray nozzles;*

*means for permitting relative movement, along a predetermined path of travel, between the nozzle apertures disposed in the second end surface of the dial assembly and the first aperture disposed in the disc member so that as a result of relative movement along the path of travel, a nozzle aperture in the second end surface may be selectively moved into and out of registry with the first aperture in the disc member thereby permitting water to flow from the conduit means through the first aperture and the nozzle aperture and then out of the spray nozzle which is in communication with the nozzle aperture; and*

*sealing means for forming a seal between the second end surface of the dial assembly and the second surface of the disc member and about the first aperature, both when the first aperture and a nozzle aperture are in registry and when a nozzle aperture is immediately adjacent to but not yet in registry with the first aperture, the sealing means being disposed in the groove in the second surface of the disc member, with the predetermined path of the groove being coincident with the path of travel.*

* * * * *